United States Patent
Yoshida et al.

(10) Patent No.: US 6,290,154 B1
(45) Date of Patent: Sep. 18, 2001

(54) STRAND CUTTING APPARATUS

(75) Inventors: Minoru Yoshida; Yoshihito Tamaki; Minori Takata, all of Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/436,727

(22) Filed: Nov. 9, 1999

(30) Foreign Application Priority Data

Nov. 10, 1998 (JP) .................................................. 10-334980

(51) Int. Cl.$^7$ ...................................................... B02C 18/18
(52) U.S. Cl. ............................. 241/65; 241/225; 241/242
(58) Field of Search ................................. 241/285.3, 65, 241/242, 225

(56) References Cited

U.S. PATENT DOCUMENTS

| | | |
|---|---|---|
| 2,524,751 | 10/1950 | Berger . |
| 3,831,867 | 8/1974 | Hansen . |
| 3,837,586 | 9/1974 | Perschbacher et al. . |

FOREIGN PATENT DOCUMENTS

| | | |
|---|---|---|
| 382427 | 11/1964 | (CH) . |
| 406613 | 8/1966 | (CH) . |
| 26 00 078 | 7/1977 | (DE) . |
| 0 013 575 | 1/1980 | (EP) . |
| 0 462 887 A1 | 12/1991 | (EP) . |
| 1 323 571 | 7/1973 | (GB) . |

*Primary Examiner*—Mark Rosenbaum
(74) *Attorney, Agent, or Firm*—Sughrue, Mion, Zinn, Macpeak & Seas, PLLC

(57) ABSTRACT

A strand cutting apparatus includes a fixed blade having a blade edge extending perpendicularly with respect to the traveling direction of a strand, a rotation blade which is fixed to the tip portion of a rotation shaft disposed in parallel to the traveling direction of the strand and has a plurality of plate-shaped blades disposed radially at a front surface opposing to the fixed blade, and a cover for receiving pellets thus cut and exhausting the pellets out of the apparatus. The cover is formed by a lower casing of almost funnel-shape and an upper casing of a semi-cylindrical shape covering the opened portion of the lower casing. The center of the upper casing is made eccentric toward the fixed blade side with respect to the rotation axis of the rotation blade so that the distance between the inner peripheral surface of the upper casing and a phantom outer peripheral circle of the rotation blade increases gradually toward the rotation direction of the rotation blade and becomes maximum at the side of the fixed blade.

4 Claims, 6 Drawing Sheets

STRAND CUTTING APPARATUS

BACKGROUND OF THE INVENTION

1. Field of Invention

The present invention relates to a strand cutting apparatus used for a plastics pellet manufacturing apparatus.

2. Related Art

An example of a conventional strand cutting apparatuses used for a pellet manufacturing apparatus will be explained.

As shown in FIG. 7(a), the conventional strand cutting apparatus includes a take-up roller 106 formed by a pair of upper and lower rollers for taking up and sending a strand 112 on a fixed blade 101, the fixed blade 101 having a blade edge extending perpendicularly with respect to the traveling direction of the strand 112, and a rotation blade 102 fixed to the tip portion of a rotation shaft 107 which is disposed in parallel to the traveling direction of the strand 112. These take-up roller, fixed blade and rotation blade are disposed on an upper wall 120a of a casing 120 and covered by a cover 121 which is provided so as to be freely opened and closed through a not-shown hinge portion.

As shown in FIG. 7(b), the rotation blade 102 includes a rotation disc 103 fixed to the tip end of the rotation shaft 107 through a flange 107a, a plurality of projection portions 104 provided radially at the outer peripheral surface of the rotation disc 103 so as to protrude therefrom, and plate-shaped blades 105 fixed to the side surfaces of the projection portions 104 on the front sides of the rotation direction (the direction shown by an arrow) thereof, respectively. The rotation blade 102 is arranged in a manner that the rotation blade is rotated integrally with the rotation shaft 107 which is rotated through a transmission means 109 by a motor 108 mounted within the casing 120 thereby to cut the strands 112 by the blade edges of the respective plate-shaped blades 105 and the blade edge of the fixed blade 101 to sequentially form pellets.

In the aforesaid conventional technique, within the cover covering the rotation blade and the fixed blade or the like, the pellets scatter to the various direction in a manner that some pellets are flown outward by the rotation of the rotation blade along the radial direction thereof, and other pellets are dispersedly flown to the rear surface side of the rotation blade through the spaces among the respective projection portions of the rotation blade, then turned and fall into a falling opening. Thus, when the aforesaid conventional technique is employed for manufacturing the pellets made of plastics of rubber nature having a large friction coefficient, the pellets are piled up, so that it is required to perform the cleaning operation of the pellets frequently.

Further, since the take-up roller formed by the pair of upper and lower rollers are mounted on the casing, at the time of performing the cleaning operation and the maintenance operation of the apparatus, the cleaning operation and the maintenance operation of the lower roller and the fixed blade can not be started until the cover is opened and the upper roller is detached from the casing. As a result, the conventional technique has a problem that the cleaning operation and the maintenance operation are complicated.

SUMMARY OF INVENTION

The present invention was performed in view of the aforesaid problem of the conventional technique.

An object of the present invention is to realize a strand cutting apparatus wherein pellets formed by the cutting operation are prevented from being piled up and each of the cleaning operation and the maintenance operation is not complicated.

In order to achieve the aforesaid object, a strand cutting apparatus according to the present invention includes a take-up roller formed by a pair of upper and lower rollers for taking up and sending a strand on a fixed blade, the fixed blade having a blade edge extending perpendicularly with respect to a traveling direction of the strand, a disc-shaped rotation blade which has a rotation shaft disposed in parallel to the traveling direction of the strand and has a plurality of plate-shaped blades disposed radially at a front surface opposing to the blade edge of the fixed blade, and a cover for receiving pellets sequentially formed by cutting the strand by means of the fixed blade and the rotation blade and for exhausting the pellets out of the apparatus. The cover of the strand cutting apparatus is formed by a lower casing of almost funnel-shape having an opened portion at an upper surface thereof and an upper casing of a semicylindrical shape covering the opened portion of the lower casing, wherein a center of the upper casing is made eccentric toward the fixed blade side with respect to a rotation axis of the rotation blade so that a distance between an inner peripheral surface of the upper casing and a phantom outer peripheral circle drawn in accordance with a rotation of the rotation blade increases gradually toward the rotation direction of the rotation blade and becomes maximum at a side of the fixed blade.

the cover is formed by a lower casing of almost funnel-shape having an opened portion at an upper surface thereof and an upper casing of a semi-cylindrical shape covering the opened portion of the lower casing, wherein a center of the upper casing is made eccentric toward the fixed blade side with respect to a rotation axis of the rotation blade so that a distance between an inner peripheral surface of the upper casing and a phantom outer peripheral circle drawn in accordance with a rotation of the rotation blade increases gradually toward the rotation direction of the rotation blade and becomes maximum at a side of the fixed blade.

The strand cutting apparatus may be arranged in a manner that the upper casing is provided through a hinge portion so as to be freely opened and closed with respect to the opened portion of the lower casing, and the upper roller of the take-up roller is disposed on the upper casing side.

The strand cutting apparatus may be arranged in a manner that the rotation blade is provided with a plurality of cooling water holes which are provided radially so as to penetrate the rotation blade to the outer peripheral surface thereof from a hollow portion of the rotation shaft so that cooling water can be supplied toward the plate-shaped blades, and the lower casing is provided with a nozzle opened at an inner peripheral surface near the opened portion so that water can be supplied.

As described above, since the present invention is configured in the aforesaid manner, the present invention can attain the following technical advantages.

Since the pellets formed by the cutting operation are prevented from being piled up within the cover, the frequency for performing the cleaning operation and the maintenance operation can be remarkably reduced.

According to the present invention, since the upper roller can be separated from the lower roller and the upper surface side of the lower roller and the fixed blade can be opened by merely opening the upper cover, it is not required to remove and attach the upper roller at the time of performing the cleaning operation and the maintenance operation, so that these operations can be performed quite easily.

DETAILED DESCRIPTION OF PREFERRED EMBODIMENTS

A strand cutting apparatus according to embodiments of the present invention will be explained with reference to the accompanying drawings.

Figure 1:
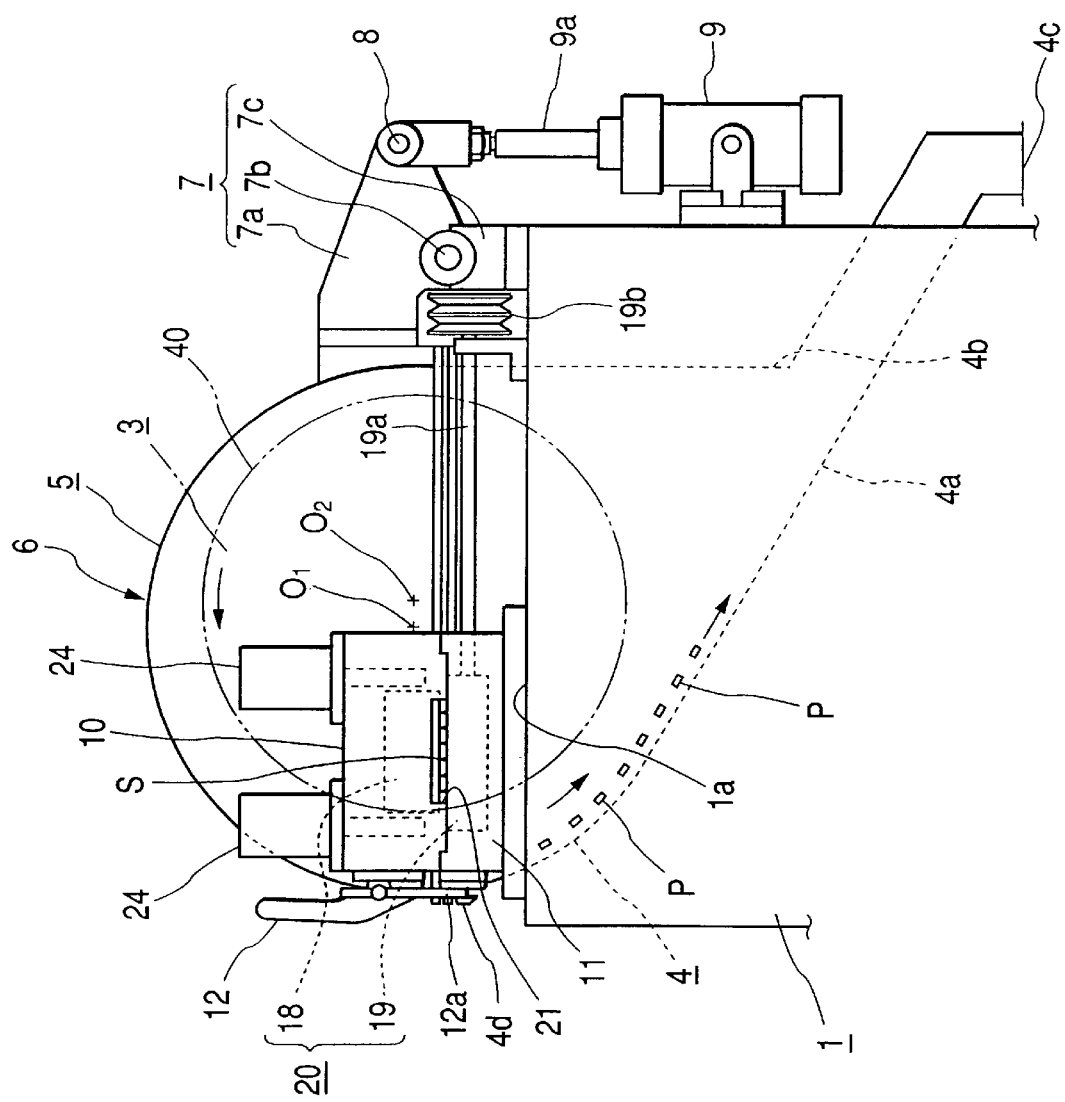
FIG. 1 is a typical front view showing the strand cutting apparatus according to an embodiment of the present invention.
Figure 2:
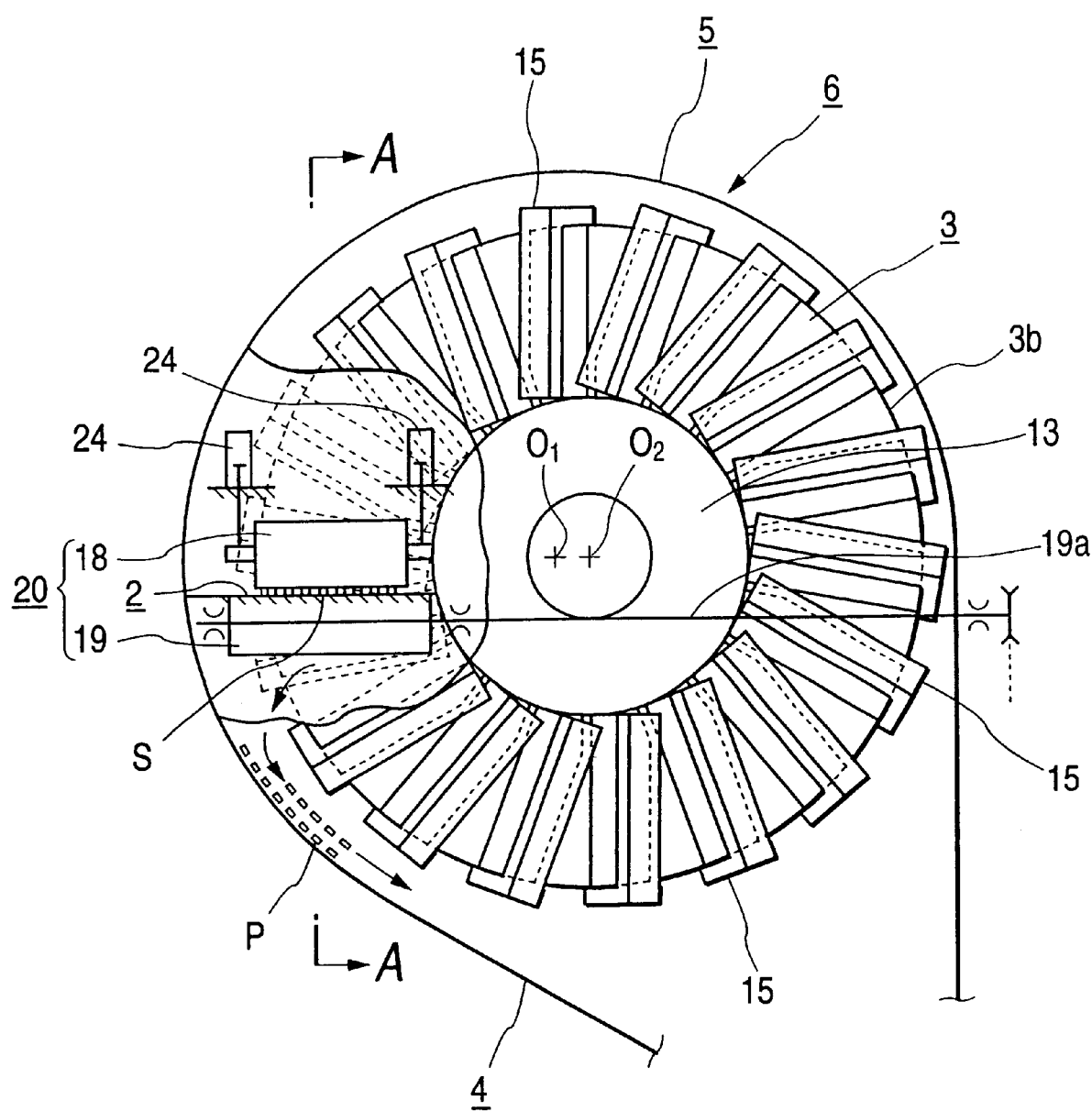
FIG. 2 is an explanatory diagram showing the positional arrangement of a rotation blade and a cover in the strand cutting apparatus shown in FIG. 1.
Figure 3:
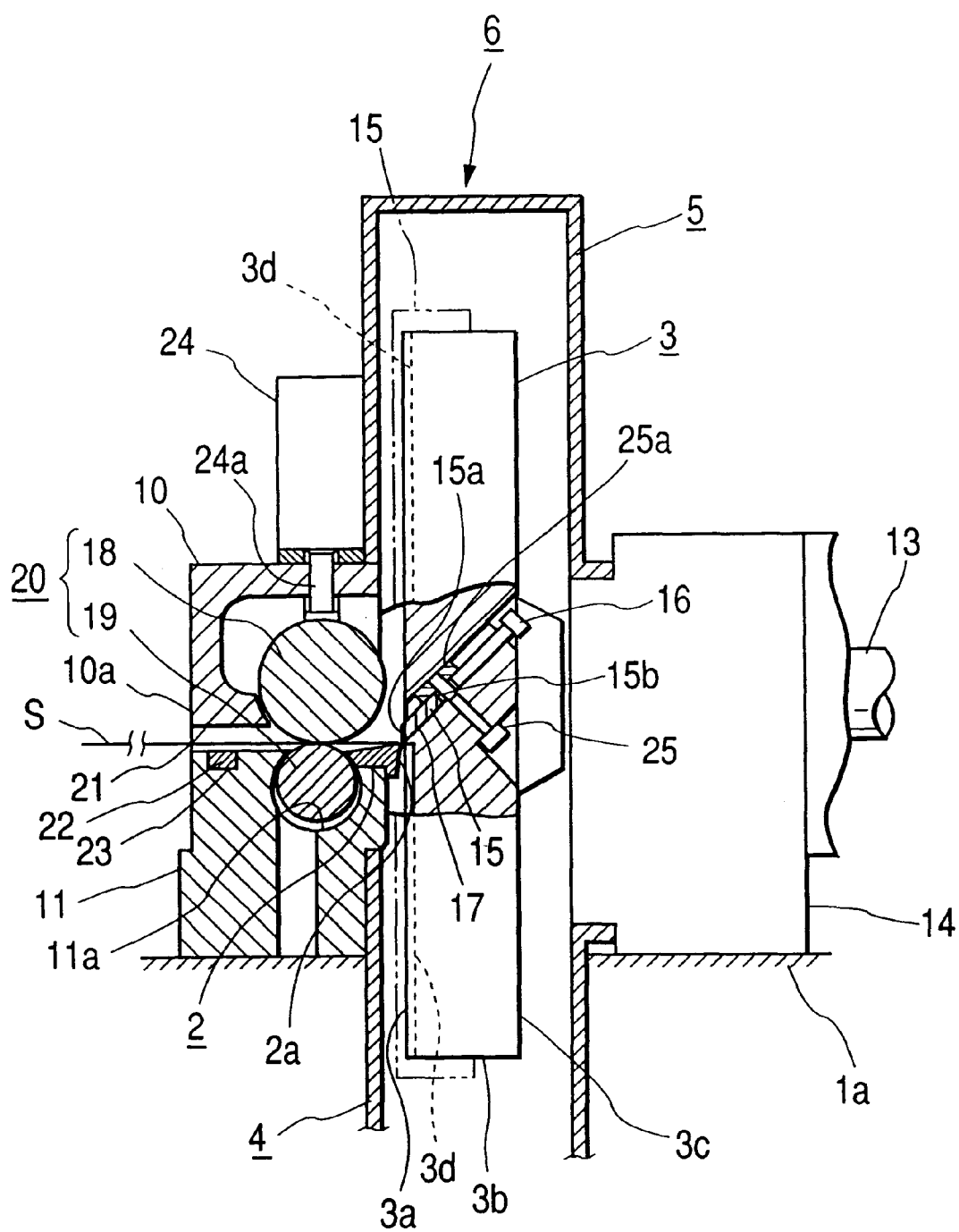
FIG. 3 is a typical sectional view of the strand cutting apparatus cut along a line A—A in FIG. 2.

FIGS. 1 to 3 show the strand cutting apparatus according to an embodiment of the present invention, wherein FIG. 1 is a typical front view thereof, FIG. 2 is an explanatory diagram showing the positional arrangement of a rotation blade and a cover, and FIG. 3 is a typical sectional view of the strand cutting apparatus cut along a line A—A in FIG. 2.

The strand cutting apparatus according to the embodiment includes a take-up roller 20 formed by a pair of upper and lower rollers 18, 19 for taking up and sending a strand S on a fixed blade 2, the fixed blade 2 having a blade edge 2a extending perpendicularly with respect to the traveling direction of the strand S, a disc-shaped rotation blade 3 which is fixed to the tip portion of a rotation shaft 13 disposed in parallel to the traveling direction of the strand S and has a plurality of plate-shaped blades 15 disposed radially at a front surface 3a opposing to the blade edge 2a of the fixed blade 2, and a cover 6 for receiving pellets P sequentially formed by cutting the strands by means of the fixed blade 2 and the rotation blade 3 and for exhausting the pellets out of the apparatus.

A plurality of guide grooves 3d for guiding the pellets P thus cut to the outside of the radius direction are formed at the front surface 3a of the rotation blade 3 so as to extend radially from the vicinity of the blade edges 15a of the respective plate-shaped blades 15.

The cover 6 is formed by a lower casing 4 of almost funnel-shape having an opened portion at the upper surface thereof and an upper casing 5 provided at the opened portion of the lower casing 4 through a hinge portion 7 so as to be freely opened and closed.

The lower casing 4 includes a bottom wall 4a which continues from an arc-shaped portion at the vicinity of the opened portion of the upper surface thereof and slants toward the lower portion of one side wall 1b of the casing 1, and a side wall 4b extending almost vertically so as to oppose to the bottom wall 4a. The lower casing is arranged in a manner that the lower end portion of the bottom wall 4a communicates with an exhaust opening 4c which is opened to the outside of the casing so that the pellets P thus cut can be exhausted outside of the casing 1.

The upper casing 5 is formed in a semi-cylindrical shape so as to cover the upper half portion of the rotation blade 3.

On the non-fixed blade side (right side in the figure) of the upper casing, the almost center portion of a rotation arm 7a, which forms a part of the hinge portion 7 and is provided to protrude outward, is pivotally fixed through a pivot 7b to a projection member 7c which is provided to elect on the upper wall 1a of the casing 1. The tip portion of the rotation arm 7a is coupled through a pin 8 to the tip portion of the rod 9a of a fluid pressure cylinder 9 which is fixed to the one side wall 1b of the casing 1. According to such an arrangement, when the fluid pressure cylinder 9 is activated to expand and contract the rod 9a, the rotation arm rotates around the pivot 7b, so that the upper casing can open and close the opened portion of the lower casing 4. A clamp 12 of a rotation handle type is provided at the outer surface of the fixed blade side (left side in the figure) of the upper casing 5 in a manner that, when the hook 12a of the clamp 12 is engaged with an engaging portion 4d provided at the lower casing 4 at the time of closing the upper casing 5, the upper casing is prevented from being opened inadvertently.

The upper casing 5 of a semi-cylindrical shape is disposed in a state that the center $O_1$ thereof is made eccentric toward the fixed blade side with respect to the rotation axis $O_2$ of the rotation blade 3 and so arranged in a manner that, when the upper casing is closed with respect to the lower casing 4, the distance between the inner peripheral surface of the upper casing 5 and a phantom outer peripheral circle 40 drawn by the radial tip portion of the plate-shaped blade 15 of the rotation blade 3 increases gradually toward the rotation direction of the rotation blade 3 and becomes maximum at the side of the fixed blade 2. According to such a configuration, since the air flow is generated toward the arrow direction shown in the figure in accordance with the rotation of the rotation blade 3, the pellets P thus cut are directed toward the lower casing 4, whereby the pallets P are flown down along the slanted bottom wall 4a of the lower casing 4 and then exhausted out of the apparatus from the exhaust opening 4c without being piled up.

In the present invention, although the upper casing 5 is rotated by the power-driven device, that is, the fluid pressure cylinder 9 as shown in the embodiment, the present invention is not limited thereto, and the upper casing 5 may be arranged to be manually opened.

The lower roller 19 of the take-up roller 20 is disposed so as to be rotatable freely within a concave portion 11a provided at the upper surface of a pedestal 11, and is forcedly rotated by means of a belt which is wound between a pulley 19b integrally provided at the tip portion of a rotation shaft 19a protruded at the right side in the figure and a not-shown pulley of an output shaft of a not-shown driving motor. In contrast, the upper roller 18 is pivotally supported so as to be freely rotatable by the lower end portions of the rods 24a of a pair of fluid pressure cylinders 24 fixed to the upper casing 5.

Since the take-up roller 20 is configured in the aforesaid manner, at the time of closing the upper casing 5 with respect to the lower casing 4, the pair of the fluid pressure cylinders 24 are activated to expand and contract the rod 24a thereby to move the upper roller 18 forward and backward relative to the lower roller 19, whereby the strand S can be taken up in such a state that the strand is applied with a predetermined pressing stress between the upper roller 18 and the lower roller 19 and then sent stably on the fixed blade 2.

A roller cover 10 integrally provided at the upper casing 5 is formed in an almost eaves shape so that the roller cover can cover the pedestal 11 so as not to expose it as well as the upper roller 18 when the upper casing 5 is closed relative to the lower casing 4. The roller cover is provided at the lower end portion of a front wall 10a thereof with a notch portion serving as a strand introducing inlet 21.

A parallel key 22 is protrusively provided at the lower end of the front wall 10a of the roller cover 10 in a manner that, when the upper casing 5 is closed with respect to the lower casing 4, the parallel key 22 fits into a key groove 23 formed at the upper surface of the pedestal 11 thereby to position the upper casing 5 and the upper roller 18 at predetermined positions.

As shown in FIG. 3, the rotation shaft 13 of the rotation blade 3 is pivotally supported by a supporting member 14 elected on the upper wall 1a of the casing 1 through a pivot (not shown) so as to be freely rotatable in a manner that the rotation shaft is deviated from the fixed blade 2 toward the one side thereof so as to be in parallel to the traveling direction of the strand S. Accordingly, when the rotation shaft 13 is driven and rotated by a not-shown motor, the strands S sent on the blade edge 2a of the fixed blade 2 are sequentially cut by the blade edges 15a of the plurality of the plate-shaped blades 15 radially provided at the front surface 3a opposing to the fixed blade 2 thereby to form pellets sequentially.

The rotation blade 3 is provided with a plurality of blade guide grooves 17 extending radially and opened at the front surface 3a and an outer periphery surface 3b thereof. The plate-shaped blades 15 are respectively fitted into the guide grooves 17 in a state that the blade edges 15a thereof are protruded from the front surface 3a.

Figure 4:
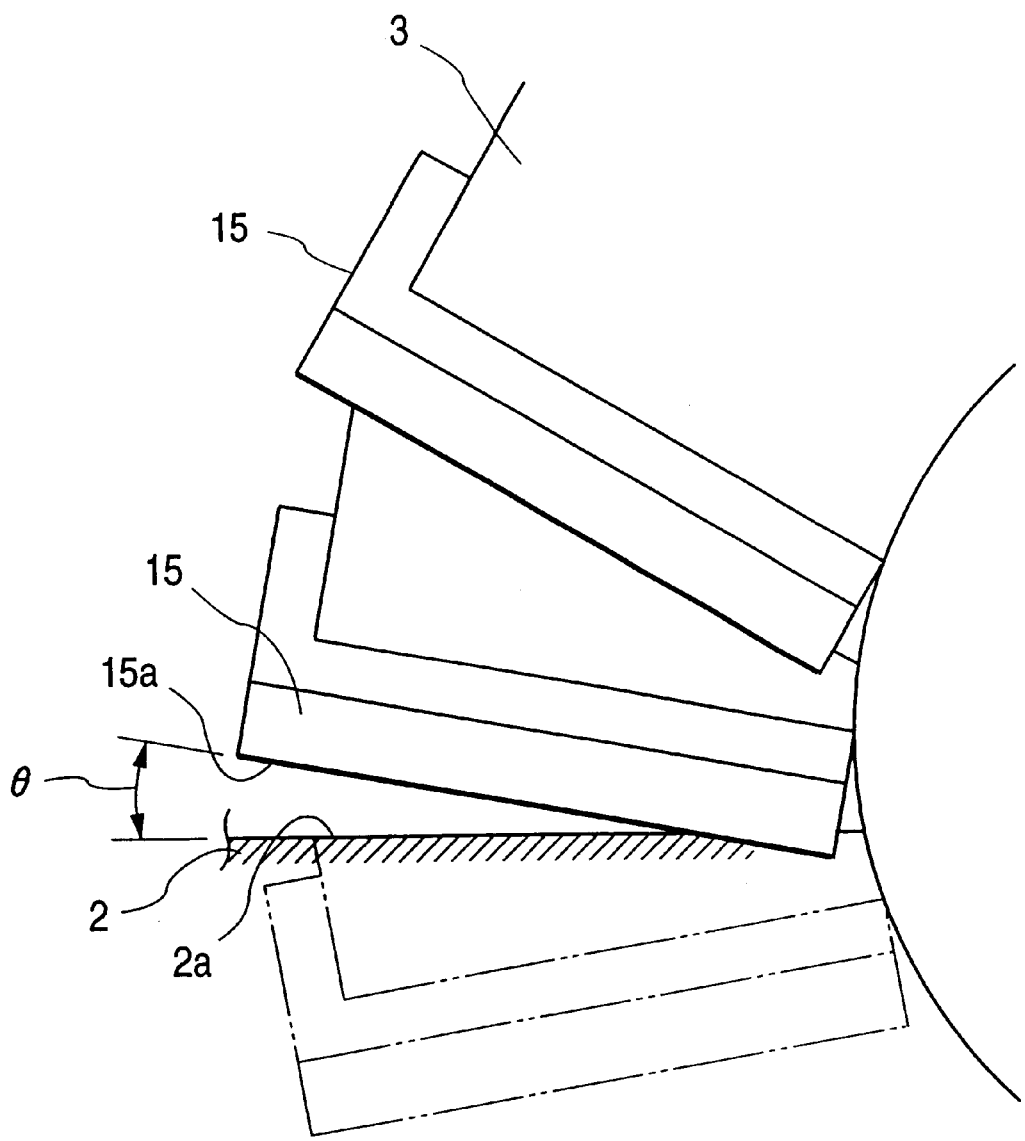
FIG. 4 is an explanatory diagram showing the relation between the blade edge of a fixed blade and the plate-shaped blade of a rotation blade.

Each of the guide grooves 17 for the plate-shaped blades is slanted with respect to the rotation axis with a predetermined upgrade slanted angle from the front surface 3a side to the rear surface 3c side of the rotation blade 3 and also slanted to the anti-rotation direction with respect to the radiation lines of the rotation blade 3 in a manner that the radial inner side of the blade edge 15a of the plate-shaped blade 15 firstly crosses with the blade edge 2a of the fixed blade 2 in accordance with the rotation of the rotation blade 3 to form a predetermined angle between both the blade edges 15a and 2a (hereinafter called an intrusion angle θ) at this time (see FIG. 4). The plate-shaped blade 15 is arranged in a manner that a protruding amount thereof from the front surface 3a can be changed within a range of the length of a slit 15b of the plate-shaped blade 15 by forwardly and reversely rotating a push pull bolt 16 which is engaged with a screw hole which penetrates from the rear surface 3c of the rotation blade 3 to the bottom wall of the guide groove 17 for the plate-shaped blade. Further, the plate-shaped blade 15 can be fixed by fastening a fastening bolt 25 which penetrates through the slit 15b from the rear surface 3c side and is engaged with a fastening plate 25a.

According to the present invention, when the aforesaid intrusion angle θ between both the blade edges 15a and 2a is set in a range of 5° to 15°, a plurality of the strands S aligned on the blade edge 2a of the fixed blade 2 are sequentially cut one by one from the radial inner side of the blade edge 15a of the plate-shaped blade 15 in a manner that the strand S can be cut almost vertically without being bent at the time of cutting operation. As a result, the load applied to the plate-shaped blade 15 of the rotation blade 3 can be reduced and the noise generated at the time of the cutting operation can also be reduced.

When the intrusion angle θ is set to be smaller than 50°, a plurality of the strands S aligned on the blade edge 2a of the fixed blade 2 are sequentially cut in a manner that two or more strands are cut simultaneously by the blade edges 5a of the plate-shaped blades 15 of the rotation blade 3, so that the noise generated at the time of the cutting operation becomes large. In contrast, when the intrusion angle θ is set to be larger than 15°, a plurality of the strands S aligned on the blade edge 2a of the fixed blade 2 are deviated to a large extent toward the radially outside and bent before being cut by the blade edge 15a of the plate-shaped blade 15 of the rotation blade 3, SO that the strands can not be cut vertically and so the pellet is cut into a diamond shape.

An example of the modification of the strand cutting apparatus according to the present invention will be explained.

Figure 5:
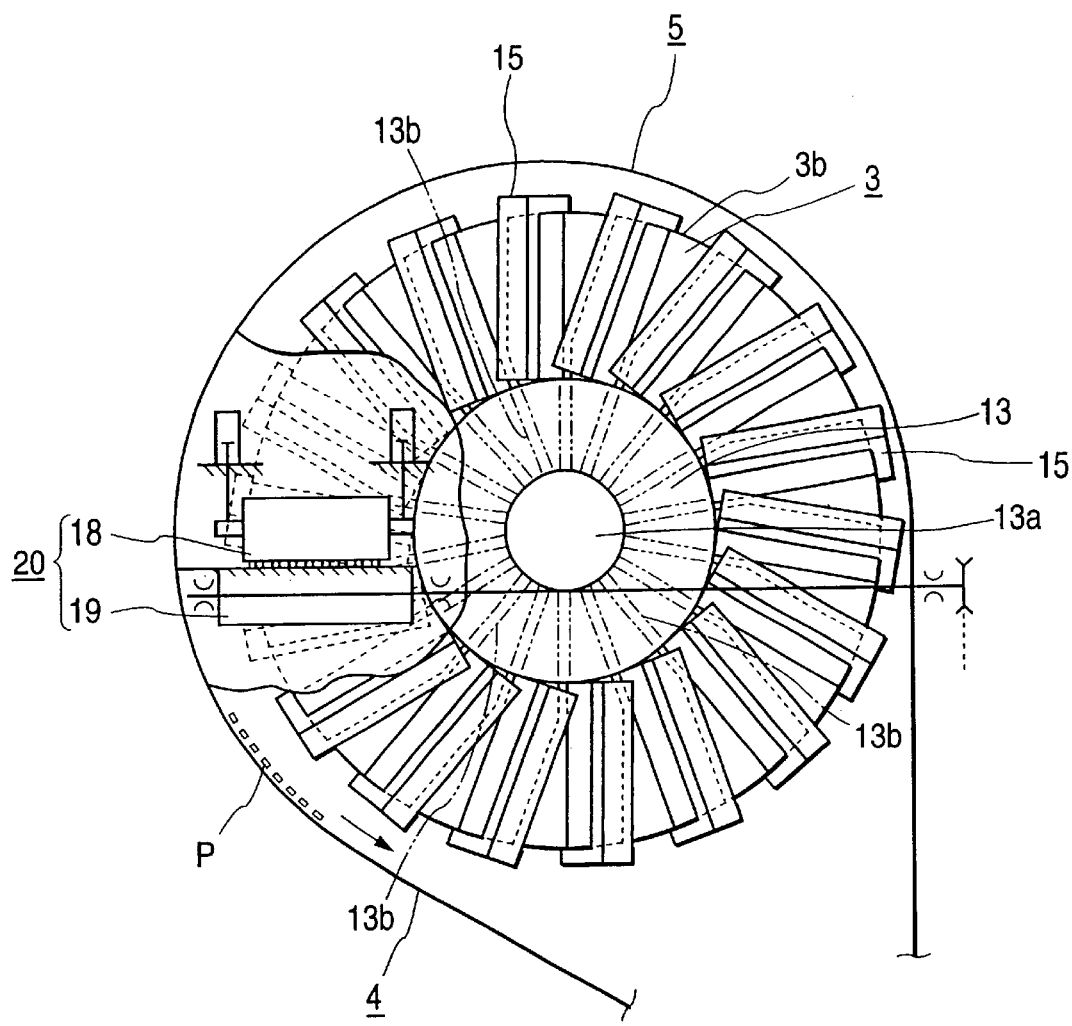
FIG. 5 is a diagram similar to FIG. 2 showing the strand cutting apparatus according to an example of a modification of the present invention.
Figure 6:
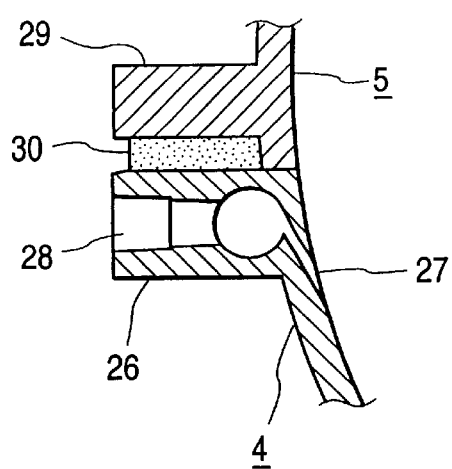
FIG. 6 is a typical partial sectional view showing a main portion of an upper casing and a lower casing in the strand cutting apparatus shown in FIG. 5.
Figure 7A:
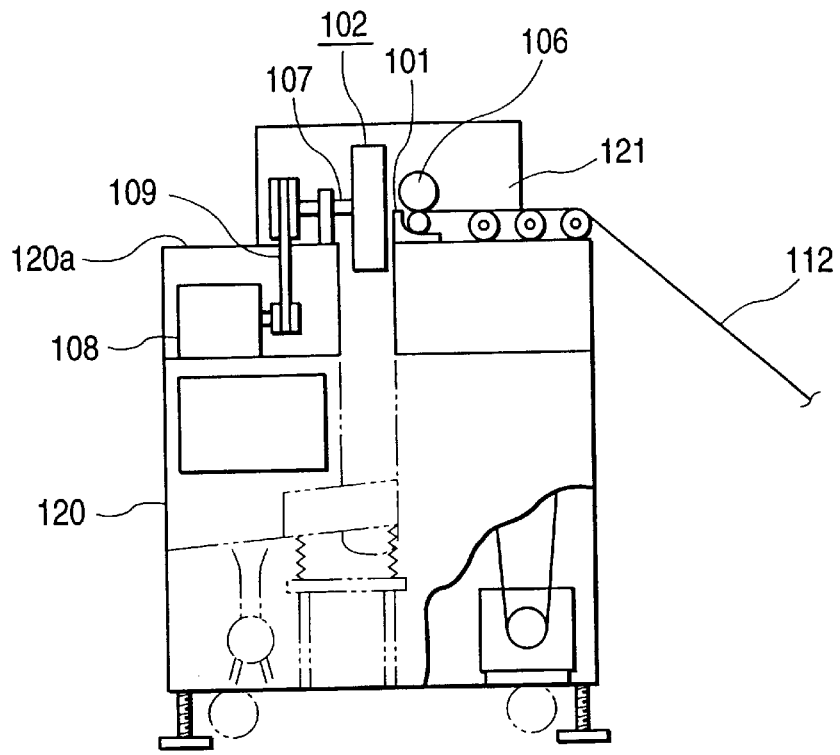
FIGS. 7A and 7B are examples of a conventional strand cutting apparatus, wherein (a) is an explanatory diagram showing the entire outline thereof and (b) is a typical front view of a rotation blade thereof.
Figure 7B:
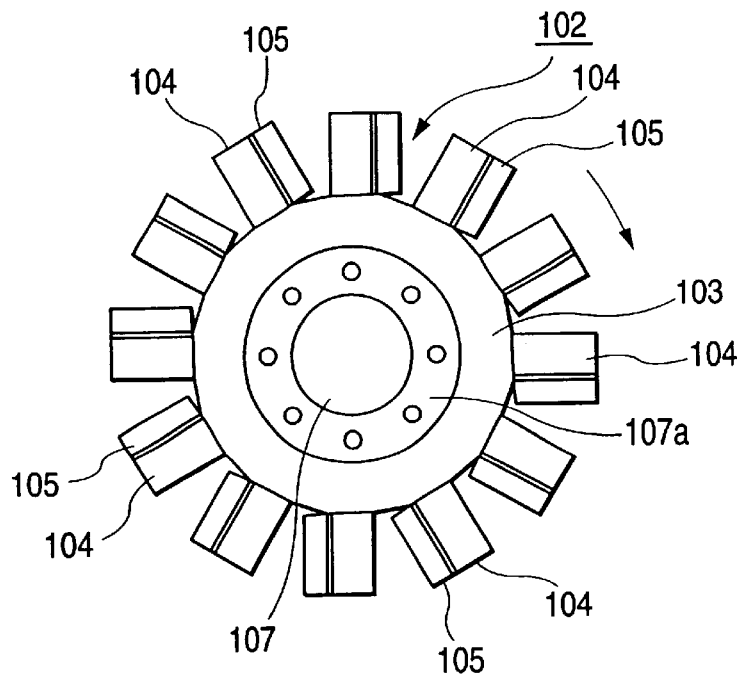

As shown in FIG. 5, the example of the modification of the strand cutting apparatus is arranged in a manner that the rotation blade 3 is provided with a plurality of cooling water holes 13b which are provided radially so as to penetrate the rotation blade to the radial direction from a hollow portion 13a of the rotation shaft 13 toward the plate-shaped blades 15, respectively, whereby the cooling water can be supplied toward the plate-shaped blades 15 through the cooling water holes 13b, respectively, by coupling the hollow portion 13a to a not-shown water supply source. As shown in FIG. 6, the lower casing 4 is provided at a portion near the opened portion on the upper surface thereof with a nozzle 27 opened on the inner peripheral surface of the lower casing 4, whereby the water can be supplied toward the bottom wall 4a from the portion near the opened portion within the lower casing 4 by coupling the nozzle 27 to a not-shown water supply source through an introduction path 28.

Further, this modification is arranged in a manner that the lower casing 4 and the upper casing 5 are provided with a flange portion 26 and a flange portion 29, respectively, and a packing 30 is disposed between both the flange portions 26 and 29 so that the cooling water does not leak from the cover 6.

The portions of this modification other than the aforesaid portions may be same as the strand cutting apparatus according to the first embodiment shown in FIGS. 1 to 3, and so the explanation thereof is omitted.

In the strand cutting apparatus according to the modification, the pellets cut within the cover can be cooled by the cooling water, so that the strand cutting apparatus according to the modification can be used as a pellet manufacturing apparatus which performs a so-called secondary cooling in which the strand such as polyethylene terephthalate, polyamide or the like extruded by an extruding device is cut in a state that the surface layer of the strand is solidified but the inner portion thereof is soft, and then the strand is cooled and solidified.

As described above, since the present invention is configured in the aforesaid manner, the present invention can attain the following technical advantages.

Since the pellets formed by the cutting operation are prevented from being piled up within the cover, the frequency for performing the cleaning operation and the maintenance operation can be remarkably reduced.

According to the present invention, since the upper roller can be separated from the lower roller and the upper surface side of the lower roller and the fixed blade can be opened by merely opening the upper cover, it is not required to remove and attach the upper roller at the time of performing the cleaning operation and the maintenance operation, so that these operations can be performed quite easily.

What is claimed is:

1. A strand cutting apparatus comprising:

a take-up roller formed by a pair of upper and lower rollers for taking up and sending a strand on a fixed blade, said fixed blade having a blade edge extending perpendicularly with respect to a traveling direction of said strand:

a disc-shaped rotation blade having a rotation shaft disposed in parallel to said traveling direction of said strand and having a plurality of plate-shaped blades disposed radially at a front surface opposing to said blade edge of said fixed blade; and a cover for receiving pellets sequentially formed by cutting said strand by said fixed blade and said rotation blade and for exhausting said pellets out of said apparatus, said cover is defined by a lower casing of substantially funnel-shaped having an opened portion at an upper surface thereof and an upper casing of a semi-cylindrical shape covering said opened portion of said lower casing, wherein a center of said upper casing is made eccentric toward said fixed blade side with respect to a rotation axis of said rotation blade so that a distance between an inner peripheral surface of said upper casing and a phantom outer peripheral circle drawn in accordance with a rotation of said rotation blade increases gradually toward the rotation direction of said rotation blade and becomes maximum at a side of said fixed blade, wherein said upper roller of said take-up roller is disposed on said upper casing.

2. A strand cutting apparatus according to claim 1, wherein said upper casing is provided through a hinge portion so as to be freely opened and closed with respect to said opened portion of said lower casing.

3. A strand cutting apparatus according to claim 2, wherein said rotation blade has a plurality of cooling water holes which are provided radially so as to penetrate said rotation blade to the outer peripheral surface thereof from a hollow portion of said rotation shaft so that cooling water can be supplied toward said plate-shaped blades, and said lower casing has a nozzle opened at an inner peripheral surface near said opened portion so that water can be supplied.

4. A strand cutting apparatus, comprising:

a take-up roller formed by a pair of upper and lower rollers for taking up and sending a strand on a fixed blade, said fixed blade having a blade edge extending perpendicularly with respect to a traveling direction of said strand;

a disc-shaped rotation blade having a rotation shaft disposed in parallel to said traveling direction of said strand and having a plurality of plate-shaped blades disposed radially at a front surface opposing to said blade edge of said fixed blade; and a cover for receiving pellets sequentially formed by cutting said strand by said fixed blade and said rotation blade and for exhausting said pellets out of said apparatus, said cover is defined by a lower casing of substantially funnel-shape having an opened portion at an upper surface thereof and an upper casing of a semi-cylindrical shape covering said opened portion of said lower casing, wherein a center of said upper casing is made eccentric toward said fixed blade side with respect to a rotation axis of said rotation blade so that a distance between an inner peripheral surface of said upper casing and a phantom outer peripheral circle drawn in accordance with a rotation of said rotation blade increases gradually toward the rotation direction of said rotation blade and becomes maximum at a side of said fixed blade, wherein said rotation blade has a plurality of cooling water holes which are provided radially so as to penetrate said rotation blade to the outer peripheral surface thereof from a hollow portion of said rotation shaft so that cooling water can be supplied toward said plate-shaped blades, and said lower casing has a nozzle opened at an inner peripheral surface near said opened portion so that water can be supplied.

\* \* \* \* \*